United States Patent
Doy et al.

(10) Patent No.: US 9,199,616 B2
(45) Date of Patent: Dec. 1, 2015

(54) SYSTEM AND METHOD FOR DETERMINING A GROUND SPEED OF A MACHINE

(75) Inventors: Nathaniel Doy, Peoria, IL (US); Erik Eddington, Bartonville, IL (US); Eric Dishman, Peoria, IL (US); Robert Shockency, Creve Coeur, IL (US)

(73) Assignee: Caterpillar Inc., Peoria, IL (US)

( * ) Notice: Subject to any disclaimer, the term of this patent is extended or adjusted under 35 U.S.C. 154(b) by 520 days.

(21) Appl. No.: 13/316,698

(22) Filed: Dec. 12, 2011

(65) Prior Publication Data

US 2012/0158209 A1 Jun. 21, 2012

Related U.S. Application Data

(60) Provisional application No. 61/424,969, filed on Dec. 20, 2010.

(51) Int. Cl.
*B60T 8/172* (2006.01)

(52) U.S. Cl.
CPC ............ *B60T 8/172* (2013.01); *B60T 2210/36* (2013.01); *B60T 2250/04* (2013.01)

(58) Field of Classification Search
CPC ..... E02F 9/2296; E02F 9/2029; E02F 9/2246; E02F 3/847; E02F 9/2253; E02F 3/437; E02F 9/2235; E02F 3/842; E02F 3/845; E02F 3/434; E02F 3/432; A01B 69/008; G05D 1/0278; G05D 2201/0202; G05D 1/027; G05D 1/0274; G01S 19/14; Y02T 10/7077
USPC ........................................................ 701/50
See application file for complete search history.

(56) References Cited

U.S. PATENT DOCUMENTS

| | | | | |
|---|---|---|---|---|
| 4,630,685 A * | 12/1986 | Huck et al. | .......................... | 172/7 |
| 5,398,766 A * | 3/1995 | Nakayama et al. | ............ | 172/4.5 |
| 5,487,428 A * | 1/1996 | Yamamoto et al. | ............ | 172/4.5 |
| 5,560,431 A * | 10/1996 | Stratton | ............................ | 172/2 |
| 5,646,844 A * | 7/1997 | Gudat et al. | .................... | 701/409 |
| 5,694,317 A * | 12/1997 | Nakagami et al. | .............. | 701/50 |
| 5,764,511 A * | 6/1998 | Henderson | ....................... | 700/66 |
| 5,860,480 A * | 1/1999 | Jayaraman et al. | ............... | 172/2 |
| 5,875,854 A * | 3/1999 | Yamamoto et al. | ............ | 172/4.5 |
| 5,944,764 A * | 8/1999 | Henderson et al. | .............. | 701/50 |
| 5,951,613 A * | 9/1999 | Sahm et al. | ..................... | 701/50 |
| 5,987,371 A * | 11/1999 | Bailey et al. | .................... | 701/50 |
| 6,047,227 A * | 4/2000 | Henderson et al. | ............. | 701/50 |
| 6,141,614 A * | 10/2000 | Janzen et al. | .................... | 701/50 |
| 6,269,885 B1 * | 8/2001 | Barber et al. | ....................... | 172/7 |
| 6,275,758 B1 * | 8/2001 | Phelps | ............................ | 701/50 |
| 6,345,231 B2 * | 2/2002 | Quincke | ....................... | 701/468 |
| 6,389,345 B2 * | 5/2002 | Phelps | ............................ | 701/50 |
| 6,405,107 B1 | 6/2002 | Derman | | |
| 6,418,364 B1 * | 7/2002 | Kalafut et al. | .................. | 701/50 |

(Continued)

FOREIGN PATENT DOCUMENTS

JP 10221098 8/1998

*Primary Examiner* — Bhavesh V Amin
(74) *Attorney, Agent, or Firm* — Leonard Stewart

(57) ABSTRACT

The disclosure describes, in one aspect, a method for determining a machine ground speed. The method includes determining a first speed from a position determining system, determining a direction the machine is traveling at the first speed, determining a machine rate of inclination, and determining a compensated ground speed as a function of the first speed and the machine rate of inclination.

18 Claims, 2 Drawing Sheets

(56) References Cited

U.S. PATENT DOCUMENTS

| | | |
|---|---|---|
| 6,434,462 B1 * | 8/2002 | Bevly et al. ............... 701/50 |
| 6,480,152 B2 | 11/2002 | Lin et al. |
| 6,564,148 B2 | 5/2003 | Morgan et al. |
| 6,701,239 B2 * | 3/2004 | Keefer ....................... 701/50 |
| 6,714,851 B2 | 3/2004 | Hrovat et al. |
| 6,845,311 B1 * | 1/2005 | Stratton et al. ............ 701/50 |
| 6,880,643 B1 * | 4/2005 | Zimmerman et al. ...... 172/4.5 |
| 6,885,968 B2 | 4/2005 | Breed et al. |
| 6,996,464 B2 | 2/2006 | Sorrells |
| 7,003,386 B1 * | 2/2006 | Ericsson et al. ........... 701/50 |
| 7,293,376 B2 * | 11/2007 | Glover ....................... 37/414 |
| 7,555,855 B2 * | 7/2009 | Alshaer et al. ............ 37/382 |
| 7,677,323 B2 * | 3/2010 | Stratton et al. ............ 172/7 |
| 7,734,398 B2 * | 6/2010 | Manneppalli .............. 701/50 |
| 8,103,417 B2 * | 1/2012 | Gharsalli et al. .......... 701/50 |
| 2007/0219720 A1 | 9/2007 | Trepagnier et al. |
| 2008/0109141 A1 | 5/2008 | Nichols et al. |
| 2008/0119993 A1 | 5/2008 | Breed |
| 2008/0294342 A1 | 11/2008 | Hoshizaki et al. |
| 2009/0018772 A1 | 1/2009 | Watanabe et al. |
| 2010/0053715 A1 | 3/2010 | O'Neill et al. |
| 2010/0274434 A1 | 10/2010 | Donnelli et al. |
| 2012/0158209 A1 * | 6/2012 | Doy et al. ................... 701/1 |

* cited by examiner

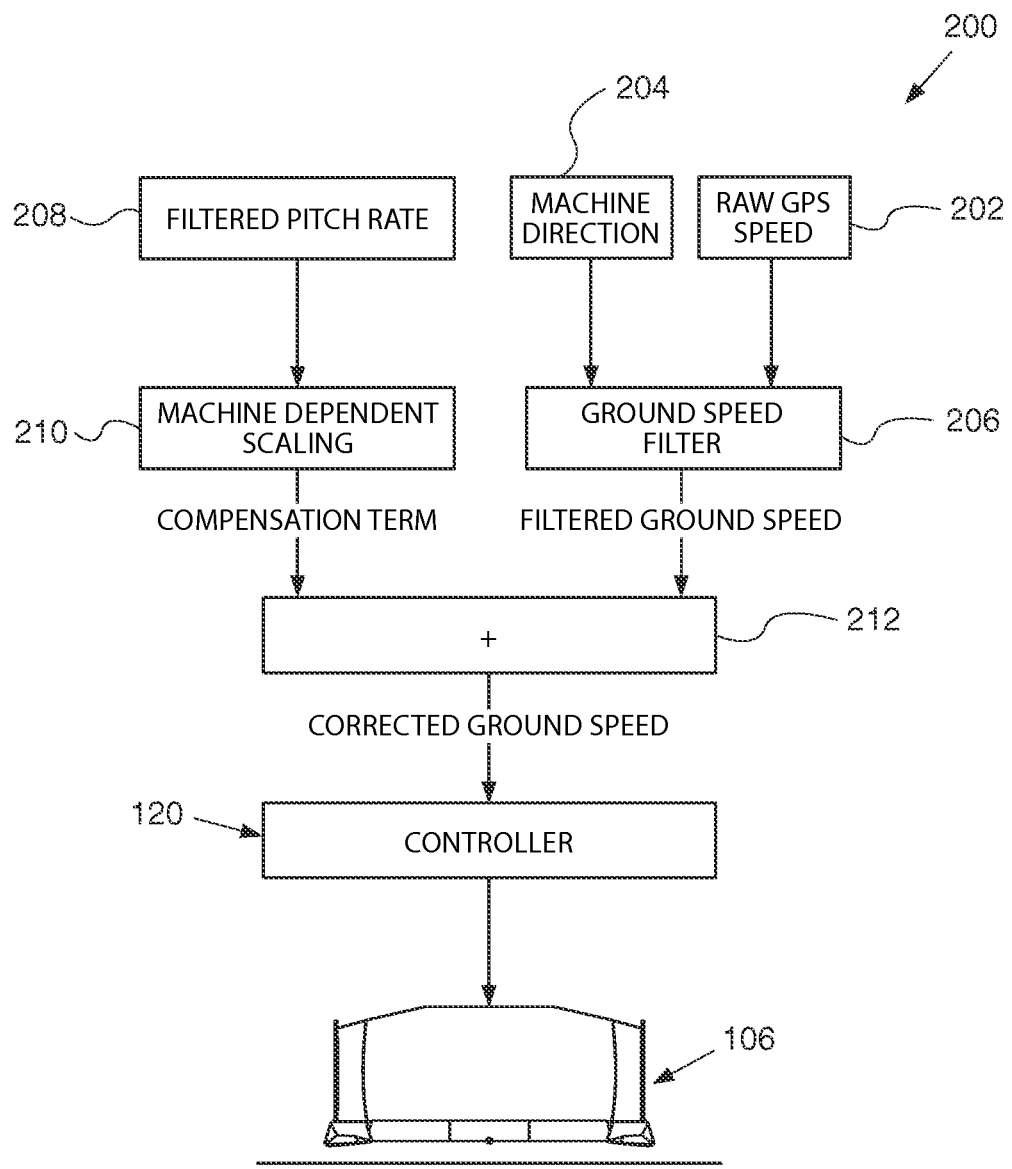

SYSTEM AND METHOD FOR DETERMINING A GROUND SPEED OF A MACHINE

RELATED APPLICATIONS

This application is based upon and claims the benefit of priority from U.S. Provisional Application No. 61/424,969 by Nathaniel S. Doy et al., filed Dec. 20, 2010, the contents of which are expressly incorporated herein by reference.

TECHNICAL FIELD

This patent disclosure relates generally to a control system, and more particularly to systems and methods for determining a ground speed for controlling a machine component.

BACKGROUND

Earthmoving machines such as track type tractors, motor graders, scrapers, and/or backhoe loaders, have an implement such as a dozer blade or bucket, which is used on a worksite in order to alter a geography or terrain of a section of earth. The machine and/or the implement may be controlled by an operator or by a control system to perform work on the worksite such as achieving a final surface contour or a final grade on the worksite. Positioning the implement, however, is a complex and time-consuming task that requires expert skill and diligence if the operator is controlling the movement. Thus, it is often desirable to provide autonomous control of the machine and/or the implement to simplify operator control.

For autonomous control, it is sometimes necessary to determine the accurate ground speed of the machine to compare against a desired ground speed value for the control systems. Some machines use ground penetrating radar (GPR) and other ground based position systems to determine the ground speed. GPR components, however, are prone to failure, which may introduce errors in the ground speed determination and are often easily covered with dirt, which an operator must get out of machine, crawl under it, and remove the debris from the mounted radar. Further, radar components due to location can be damaged by rocks.

For example, U.S. Pat. No. 5,8640,480 to Jayaraman et al. ("Jayaraman") disclose a method for determining pitch and ground speed of an earth moving machine. Jayaraman discloses an automatic control system that includes a ground speed sensor that senses the ground speed of the earth moving machine and responsively produces a ground speed signal. Jayaraman teaches that the ground speed sensor is suitably positioned on the bulldozer and includes for example, a non-contacting ultrasonic or Doppler radar type sensor.

The disclosed systems and methods are directed to overcoming one or more of the problems set forth above.

SUMMARY

In one aspect, the disclosure describes, a method for determining a machine ground speed. The method includes determining a first speed from a position determining system, determining a direction the machine is traveling at the first speed, determining a machine rate of inclination, and determining a compensated ground speed as a function of the first speed and the machine rate of inclination.

BRIEF DESCRIPTION OF THE DRAWING(S)

FIG. 2 is a flow diagram illustrating one embodiment of a control process in accordance with an exemplary embodiment of the present disclosure.

DETAILED DESCRIPTION

Figure 1:
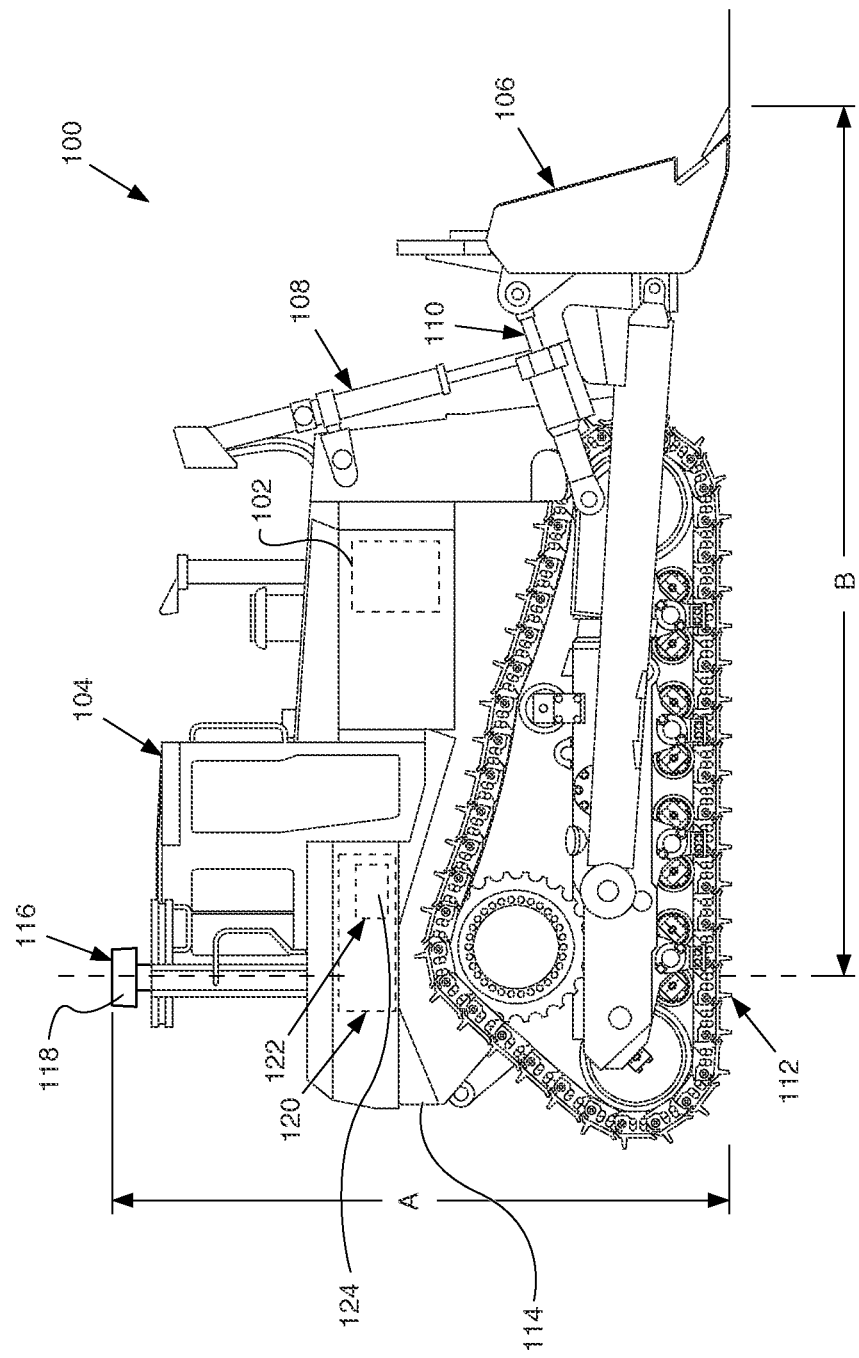
FIG. 1 illustrates a side view of a machine having a control system in accordance with an exemplary embodiment of the present disclosure.

This disclosure relates to systems and methods for determining a ground speed of a machine. An exemplary embodiment of a machine 100 is shown schematically in FIG. 1. The machine 100 may be a mobile machine that performs some type of operation associated with an industry such as mining, construction, farming, transportation, or any other industry known in the art. For example, the machine 100 may be a track-type tractor or dozer, as depicted in FIG. 1, a scraper, or any other machine known in the art. While the following exemplary embodiments are described in connection with a dozer, it should be appreciated that the description applies equally to the use of the embodiments in other machines.

In an illustrated embodiment, the machine 100 includes a power source 102, an operator's station or cab 104 containing controls necessary to operate the machine 100, such as, for example, one or more input devices (not shown) for propelling the machine 100 and/or controlling other machine components. The machine 100 further includes an implement 106, such as, for example, a blade, a bowl, a ripper, or a bucket for moving earth.

The one or more input devices may include one or more joysticks disposed within the cab 104 and may be adapted to receive input from an operator indicative of a desired movement of the implement 106. The cab 104 may also include a user interface having a display for conveying information to the operator and may include a keyboard, touch screen, or any suitable mechanism for receiving input from the operator to control and/or operate the machine 100, the implement 106, and/or the other machine components.

The implement 106 may be adapted to engage, penetrate, or cut the surface of a worksite and may be further adapted to move the earth to accomplish a predetermined task. The worksite may include, for example, a mine site, a landfill, a quarry, a construction site, or any other type of worksite. Moving the earth may be associated with altering the geography at the worksite and may include, for example, a grading operation, a scraping operation, a leveling operation, a bulk material removal operation, or any other type of geography altering operation at the worksite.

The implement 106 may be moveable by one or more hydraulic mechanisms operatively connected to the input device in the cab 104. The hydraulic mechanisms may include one or more hydraulic lift actuators 108 and one or more hydraulic tilt actuators 110 for moving the implement 106 in various positions, such as, for example, lifting the implement 106 up or lowering the implement 106 down, tilting the implement 106 left or right, or pitching the implement 106 forward or backward. In the illustrated embodiment, the machine 100 includes one hydraulic lift actuator 108 and one hydraulic tilt actuator 110 on each side of the implement 106 (only one side shown).

The power source 102 is an engine that provides power to ground engaging mechanisms 112 adapted to support, steer, and propel the machine 100. The power source 102 may embody an engine such as, for example, a diesel engine, a gasoline engine, a gaseous fuel-powered engine, or any other type of combustion engine known in the art. It is contemplated that the power source 102 may alternatively embody a non-combustion source of power (not shown) such as, for example, a fuel cell, a power storage device, or another suitable source of power. The power source 102 may produce a mechanical or electrical power output that may be converted to hydraulic power for providing power to the machine 100, the implement 106, and to other machine 100 components.

The machine 100 further includes a frame or rigid body 114 disposed between the implement 106 and the ground engaging mechanisms 112. A position determining system 116 adapted to receive and process position data or signals may be mounted to the rigid body 114 of the machine 100. In some embodiments, the position determining system 116 may be mounted on or proximate to the top of the cab 104 at a distance A relative to the bottom of the ground engaging mechanisms 112 and a distance B relative to the tip of the implement 106. The position determining system 116 may be a global position satellite (GPS) system 118. The GPS system 118, as is well known in the art, receives signals from a plurality of satellites and responsively determines a position of a receiver in a coordinate system relative to the worksite, that is, in a site coordinate system. The site coordinate system may be a Cartesian system having an x-coordinate, a y-coordinate, and a z-coordinate.

In addition to position data, the GPS system 116 may be adapted to process a corresponding speed of the receiver. The corresponding speed may be used to determine the speed of travel of the machine 100; in other words, the GPS system 118 may be adapted to determine the travel speed or ground speed of the machine 100. In some embodiments, the GPS system 118 may determine a three-dimensional position, for example, latitude, longitude, and height, and may determine a three-dimensional speed, for example, northward, eastward, and vertical speeds. In alternative embodiments, the position determining system 116 may include other types of positioning systems mounted to the rigid body in a plurality of locations, such as, for example, inertial navigational systems (INSs), and may include a plurality of methods for determining a corresponding ground speed without departing from the scope of this disclosure.

The machine 100 may further include a control system 120 operatively connected to the input device and to the hydraulic actuators 108, 110 for controlling, for example, movement of the implement 106. In some embodiments, the control system 120 may be operatively connected to the input device and to other machine components for controlling other operations of the machine 100, such as, for example, connected to the ground engaging mechanisms 112 for controlling a speed of the machine 100. The control system 120 may direct the implement 106 to move to a predetermined or target position in response to an operators' desired movement of the implement 106 for engaging the implement 106 with the terrain of the worksite. The control system 120 may further direct the implement 106 to move to a predetermined or target position indicative of an automatically determined movement of the implement 106, based in part on, for example, an engineering or site design, a map, a productivity or load maximizing measure, or a combination of site design and productivity measure.

For precise control, such as, for example, to direct the implement 106 to move precisely in response to an automatically determined movement signal or command, the control system 120 may require certain predetermined or acquired data associated with the machine 100, such as, for example, the ground speed and/or the pitch of the machine 100. The control system 120 may include one or more sensors 122 operatively connected to or associated with the machine 100 for determining certain operational characteristics of the machine 100, such as, for example, an inclination or pitch rate sensor 124 for determining an angle, inclination, or pitch of the machine 100 and/or a rate of change associated with the angle, inclination, or pitch of the machine 100. The one or more sensors 122 may be located proximate to a pitch center of the machine 100, such as, for example, near a transmission case (not shown) of the machine 100. In some embodiments, the one or more sensors 122 may be embodied as an inertial measurement unit (INU) in an INS that measures linear and rotational degrees of freedom, such as, for example, pitch, yaw, and roll.

The control system 120 may be adapted to receive inputs from the input device, the position determining system 116, and the sensors 122, 124. The control system 120 is further adapted to control or direct the movement of the implement 106 based at least in part on the inputs from the input device, the position determining system 116, and the sensors 122, 124. It is contemplated that the one or more sensors 122 may in alternative embodiments include appropriate sensors adapted for determining roll rates and/or yaw rates to provide a three dimensional representation of the orientation of the machine 100 to determine ground speed in accordance with this disclosure.

The control system 120 may include one or more control modules (e.g. ECMs, ECUs, etc.). The one or more control modules may include processing units, memory, sensor interfaces, and/or control signal interfaces (for receiving and transmitting signals). The processing units may represent one or more logic and/or processing components used by the control system 120 to perform certain communications, control, and/or diagnostic functions. For example, the processing units may be adapted to execute routing information among devices within and/or external to the control system 120.

Further, the processing units may be adapted to execute instructions, including from a storage device, such as memory. The one or more control modules may include a plurality of processing units, such as one or more general purpose processing units and or special purpose units (for example, ASICS, FPGAs, etc.). In certain embodiments, functionality of the processing unit may be embodied within an integrated microprocessor or microcontroller, including integrated CPU, memory, and one or more peripherals. The memory may represent one or more known systems capable of storing information, including, but not limited to, a random access memory (RAM), a read-only memory (ROM), magnetic and optical storage devices, disks, programmable, erasable components such as erasable programmable read-only memory (EPROM, EEPROM, etc.), and nonvolatile memory such as flash memory.

INDUSTRIAL APPLICABILITY

The industrial applicability of the systems and methods for determining a ground speed for the machine described herein will be readily appreciated from the foregoing discussion. Although the machine is shown as a track-type tractor, the machine may be any type of machine that performs at least one operation associated with, for example, mining, construction, and other industrial applications. Moreover, the systems and methods described herein can be adapted to a large variety of machines and tasks. For example, scrapers, backhoe loaders, skid steer loaders, wheel loaders, motor graders, and many other machines can benefit from the systems and methods described.

In accordance with certain embodiments, FIG. 2 illustrates an exemplary embodiment of the control system 120 and the process of determining the ground speed of the machine 100 (200). The control system 120 is adapted to receive a speed associated with the machine 100 from the GPS system 118 (Step 202). The GPS system 118 provides the speed of the machine 100 based in part on the speed at the GPS system 118 receiver mounted to the body 114 of the machine 100. The control system 120 is adapted to receive direction information associated with the direction in which the machine 100 is traveling (204). The speed information received from the GPS system 118 may be filtered, such as, for example, using a weighted moving average (Step 206).

In some embodiments, since the GPS system 118 is mounted to the body 114 of the machine 100, which may be on or near the top of the cab 104, the GPS system 118 receiver may be located at a significant distance away from the center of gravity of the machine 100. This distance away from the center of gravity may introduce errors when the speed is determined by the GPS system 118. The errors may be associated with or correlated with the pitch of the machine 100. Thus, the control system 120 is adapted to receive a pitch rate from the one or more sensors 122 embodied as the pitch rate sensor 124 (Step 208). In some embodiments, the pitch rate data or signal may be processed to eliminate noise and bias, such as, for example, using high pass and low pass filters.

Further, the distance the GPS system 118 is away from the center of gravity is a function of the size of the machine 100. Consequently, the magnitude of the error when determining the speed may be proportionate to the distance the GPS system 118 is away from the center of gravity. The control system 120 is adapted to determine a machine dependent scale factor for adjusting the speed determined by the GPS system 118 as a function of the pitch rate (Step 210). The factor may be determined from the following equation:

$$factor = \frac{\left(\frac{2\pi[\text{rad}]}{360[\text{deg}]}\right) \text{lever\_arm}[\text{mm}]}{1000 \frac{[\text{mdeg}]}{[\text{deg}]}}$$

The lever_arm, which is essentially the distance between the pitch rate sensor 122 and the GPS system 118 receiver, may approximate the distance the GPS system 118 is away from the center of gravity or the center of pitch. The above factor may be used to determine a scaled pitch rate compensation term, which is based in part on the size of machine 100, to be used for addressing the errors introduced by the GPS system 118 as discussed above. The scaled pitch rate compensation term and the filtered speed are summed to provide a corrected ground speed (Step 212). The control system 120 is adapted to receive the corrected ground speed and may use the corrected ground speed for more precise control, for example, of the implement 106 in response to an automatically determined movement signal or command. It is contemplated that the corrected ground speed may be used by the control system 120 to control other machine operations that require an accurate ground speed, such as, for example, to control the speed of the machine 100.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for controlling a component of a machine based on a compensated ground speed, the method comprising:
   determining a first speed from a position determining system;
   determining, by a microprocessor, a direction the machine is traveling at the first speed;
   determining, by an inclination sensor, a machine rate of inclination;
   determining, by a microprocessor, a compensated ground speed as a function of the first speed, the machine rate of inclination, and a compensation term; wherein the compensation term is determined as a function of a distance between a component of the position determining system and a location of a pitch center of the machine; and
   controlling the machine component based on the compensated ground speed.

2. The method of claim 1, wherein determining the machine rate of inclination includes multiplying a pitch rate received from an inclination sensor by the compensation term.

3. The method of claim 2, wherein determining the compensated ground speed includes summing the machine rate of inclination and the first speed.

4. The method of claim 3, wherein determining the compensated ground speed includes calculating a weighted moving average of the first speed for a predetermined number of samples.

5. A control system for controlling a component of a machine based on a compensated ground speed, comprising:
   a controller operatively connected to a machine component, a position determining system, and an inclination sensor, the controller adapted to:
   determine a first speed from the position determining system;
   determine a direction the machine is traveling at the first speed;
   determine a machine rate of inclination from the inclination sensor;
   determine a compensated ground speed as a function of the first speed, the machine rate of inclination, and a compensation term; wherein the compensation term is determined as a function of a distance between a component of the position determining system and a location of a pitch center of the machine; and
   control the machine component based on the compensated ground speed.

6. The control system of claim 5, wherein the controller is further adapted to:

determine the machine rate of inclination by multiplying a pitch rate received from the inclination sensor and the compensation term.

7. The control system of claim 6, wherein the controller is further adapted to:
determine the compensated ground speed by summing the machine rate of inclination and the first speed.

8. The control system of claim 7, wherein the controller is further adapted to:
determine the compensated ground speed by calculating a weighted moving average of the first speed for a predetermined number of samples.

9. A control system for controlling a component of a machine based on a compensated ground speed comprising:
a controller operatively connected to a machine component, a GPS system, and a pitch rate sensor, the controller adapted to:
determine a first speed from the GPS system;
determine a machine pitch rate from the pitch rate sensor, the pitch rate sensor is mounted at a location proximate to a machine center of gravity;
determine the compensated ground speed as a function of the first speed, the machine pitch rate, and a compensation term, wherein the compensation term is a function of a distance between the GPS system and the location of the pitch rate sensor; and
control the machine component based on the compensated ground speed.

10. The control system of claim 9, wherein the GPS system is mounted to a body of the machine.

11. The control system of claim 10, wherein the GPS system is located proximate to the top of a cab of the machine and at a distance from the machine center of gravity.

12. The control system of claim 11, wherein the GPS system is located on the top of the cab of the machine.

13. The control system of claim 9, wherein the controller is further adapted to:
determine the compensated ground speed by summing the machine pitch rate and the first speed, wherein the machine pitch rate includes multiplying the compensation term and a pitch rate received by the pitch rate sensor.

14. The control system of claim 9, wherein the machine component is at least one of an implement or a ground engaging mechanism.

15. The method of claim 1 wherein the machine component is an implement.

16. The method of claim 1 wherein the machine component is a ground engaging mechanism.

17. The control system as claimed in claim 5 wherein the machine component is an implement.

18. The control system as claimed in claim 5 wherein the machine component is a ground engaging mechanism.

* * * * *